Patented July 9, 1957

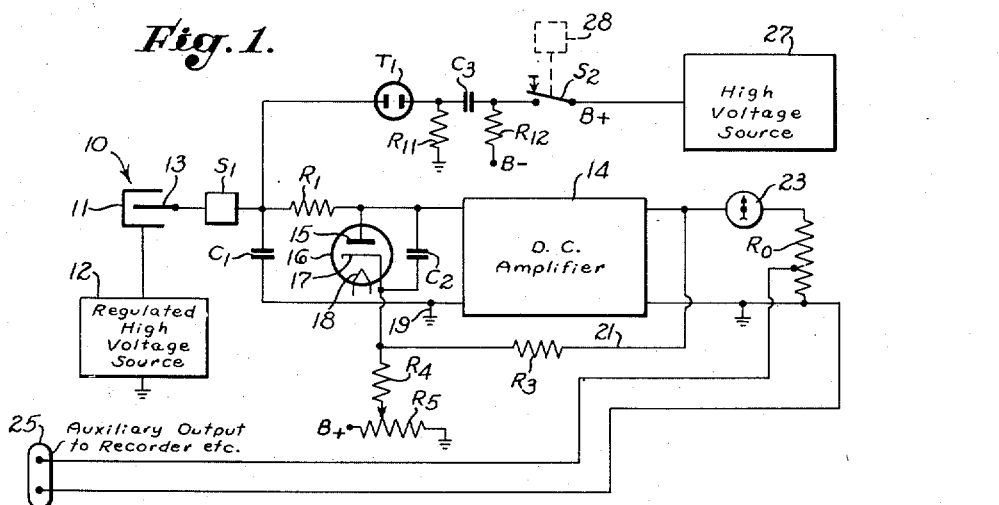

2,799,005

CURRENT MEASURING DEVICE

George H. Hare, Pasadena, and Everett W. Molloy, South San Gabriel, Calif., assignors to Beckman Instruments, Inc., South Pasadena, Calif., a corporation of California Application September 29, 1953, Serial No. 383,008

17 Claims. (Cl. 324—123)

This invention relates to a device for measuring very small unidirectional currents over an extremely wide range thereof, e. g., to a device which is capable of measuring or responding quantitatively to unidirectional currents over a range of at least six decades without switching and which may be adapted to cover a range as wide as about $10^{-3}$ to about $10^{-14}$ amperes. In its illustrated embodiment, the invention relates to a vacuum tube micromicroammeter capable of accurate response to currents in ranges of this order of magnitude.

Generally speaking, it is an object of the present invention to establish an output signal accurately proportional to the logarithm of an input current. It is an associated object of the invention to provide such a device in which the output can be used to actuate a meter, recording equipment, control equipment, etc. It is a further object of the invention to provide a device which measures currents over an extremely wide range and which is capable of indicating a range of many decades on a given single meter scale, without any range-switching, scale-switching or multi-scale interpretation.

In the past, various types of devices have been used to measure currents of extremely low magnitude. Such devices have included electrostatic electrometers and vacuum tube electrometers of various types, among them dynamic condenser electrometers. It is an object of our invention to provide an improved form of a current-measuring or current-responsive device which is different in operation and principle from previously-known devices.

With our invention, the current being measured is passed through a vacuum tube diode. If the cathode of such a tube is maintained at a constant temperature, the plate will assume a potential with respect to its cathode which is unique for the current being measured. Further, if the signal current is made to vary in magnitude, the resulting voltage across the diode will be found to vary in proportion to the logarithm of the signal current.

It is an object of our invention to provide a device which will operate effectively on this principle to measure currents of low magnitude. It is a further object of our invention to provide a device in which the potential across the input terminals is maintained constantly near zero, regardless of varying input signal level. In this respect the device of the invention acts like a classical ideal ammeter, i. e., presents negligible resistance to the source and negligible voltage drop across its terminals. Other important advantages derived from this type of operation will be disclosed hereinafter.

It is a related object of the invention to maintain the voltage across the input terminals near zero by the use of an amplifier, the output of which is fed back to the input in series with and in balanced opposition to the voltage developed across the diode.

Another object of our invention is to provide means for maintaining the cathode of the logarithmic detector diode at a constant temperature in order to maintain an accurate diode response.

It is an additional object of the invention to select a desired or optimum performance characteristic of the vacuum diode detector for a desired range of current sensitivity by accurately setting a predetermined cathode operating temperature. This can be done by varying the applied heater voltage, and, as a means of accurately measuring the cathode temperature, measuring the voltage change for a decade change of current level.

A further object of the invention is to employ diodes as logarithmic detectors at extreme low levels of signal current with high accuracy of response by operation at far below conventional cathode temperatures, and to determine and adjust temperature accurately in this region by the above-mentioned method.

In the operation of the circuit of the invention, input signal transients are frequently encountered, particularly when the source of the input is changed. Such transients are manifested as a sudden change in voltage across the input terminals, and result from the action of small residual voltages existing across the input terminals. These cause a small transfer of charge (which may be in either direction) between the source capacitance and the input capacitance of the instrument, so that at least momentarily the voltage across the terminals is altered. Such residual voltages, resulting mainly from accumulated bias drift in the amplifier input tube, change but very slowly, and are therefore of negligible concern in the normal operation of the instrument except for the mentioned effect when switching at the input. It is a further object of our invention to provide a device in which the adverse effects, occurring when such transients are of a particular polarity, can be quickly overcome, so that they do not disturb or substantially delay the reading or appearance of accurate current values.

In the operation of the circuit of our invention, transient positive voltages are dissipated through the diode detector, while transient negative voltages require the application of a neutralizing positive charge to the diode. This charge is obtained through the use of a special circuit employing a glow discharge tube. Novel means to assure the firing of such glow discharge tube within a short time interval is provided in the form of a second glow discharge tube positioned physically adjacent the first tube in such a manner as to illuminate the cathode of the first tube and thus assure the presence of a sufficient number of electrons in the tube discharge area, by photoemission from the cathode, to assure prompt firing of the tube.

A further novel means is provided for avoiding the particular transients resulting from opening the circuit of the first glow discharge tube. This comprises means for holding the circuit of the first glow discharge tube normally closed, with the tube quiescent, and, when the discharge action is desired, rapidly opening and closing the circuit to fire the tube and provide the diode with a sufficient positive charge to overcome the negative transient, without introducing additional, final negative transients into the circuit.

It is another object of our invention to provide internal means for adjusting the output of our device for a given input to serve as the equivalent of a zero adjusting function on a conventional meter. A further object is to provide test currents, by circuit means internal to the instrument, for use in the testing and adjustment of our device.

In order to obtain the widest possible total measuring range, it is desirable to have a high upper limit for measurable current. It may be possible to achieve such a result by increasing the filament temperature, but such an increase appears to affect adversely the accuracy of logarithmic response at the lower end of the signal current range. An alternative way of increasing the upper limit of measurable current is to increase the cathode area of the diode, since the amount of cathode emission is proportional to the cathode area.

We have, in any case, found that a precise setting of the cathode temperature of the diode is essential for accurate response over any desired range. It is known that our device will measure currents having a magnitude as small as $10^{-14}$ amperes and it is an object of our invention to provide a device which is capable of accurately measuring currents of this and even smaller magnitudes.

Other objects and advantages of our invention will be apparent from the following specification and the accompanying drawings, which are for purposes of illustration only, and in which:

Fig. 1 is a block diagram of our device; and
Fig. 2 is a schematic diagram of our device.

The input signal whose direct current value is to be measured is here exemplified as derived from an ionization chamber 10 having its outer cylindrical electrode 11 connected to a source 12 of sufficiently regulated high-voltage, and its inner electrode 13 connected through a switch $S_1$ and a current-limiting resistor $R_1$ to the input of a D. C. amplifier 14 and to an anode 15 of a vacuum tube diode 16 having a cathode 17 maintained at substantially constant temperature by a filament 18. The resistor $R_1$ prevents excessive surges of diode current when large positive transient voltages enter the input circuit. An input capacitor $C_1$ connected between the input terminal and a circuit ground 19 may be used to minimize the extreme differences in input capacitance which otherwise may occur on change of source or cable length and permits, for example, rather wide variations in length of the input cable that is ordinarily used, without the need for corresponding adaptation of the circuit response characteristics. Another capacitor $C_2$, connected between the anode 15 and the cathode 17, limits the magnitude of high frequency input transient components and helps simplify the requirements for amplifier response characteristics. Over a wide range of low plate currents, the voltage developed between the anode and cathode will be a logarithmic function of the current, and, neglecting the work function of the cathode surface, the anode will be found negative with respect to the cathode. This developed voltage is applied to the input grid of the amplifier 14 in series opposition with at least a portion of the amplifier output voltage, which is fed back through a conductor 21 including a resistor $R_3$. In this connection, the output of the amplifier is connected across a resistor designated as $R_0$ in Fig. 1, being in practice a composite of several resistors as shown in Fig. 2, the current through $R_0$ being indicated on a meter 23 in circuit therewith. The output voltage developed across $R_0$ and fed back to the cathode 17 is of such polarity as to buck or oppose the voltage developed across the diode. If the amplifier gain is sufficiently high, the potential across $R_0$ will always be such as to practically balance the diode potential, and the net or residual potential applied to the input grid of the amplifier becomes negligibly small compared to the balanced voltages (i. e., $1/G$ times either of these voltages, where G is amplifier gain). Under these conditions, the current through $R_0$, read from the meter 23, is accurately proportional to the logarithm of the input signal current traversing the diode, and the meter can be calibrated to read directly the input current, usually over a range of six decades or more. Also, the device may be adapted to supply a suitable output to auxiliary equipment such as a recorder or to suitable control equipment. By way of example, the voltage across a portion of $R_0$ is proportional to the logarithm of the input current traversing the diode, and can be used as an auxiliary output 25.

The use of feed-back in the present arrangement also offers the advantages of "degenerating" the input capacitance, including the distributed capacitance of the commonly-used input cable ahead of $R_1$. This has the effect of reducing the response time of the instrument by a factor equal to amplifier gain, compared to response time with undegenerated large input capacitances. Furthermore, since the voltage difference between the input conductor and the cable shield is maintained by the feedback action at a value near zero, cable leakage currents are greatly reduced. Also, assuming the minimum amplifier gain is sufficiently high, the accurate logarithmic transfer characteristic between input and output of the instrument is made substantially independent of even fairly large variations in amplifier gain. Expressed differently, the circuit of the invention permits the logarithmic accuracy inherent in the diode detector to be fully realized in over-all instrument performance.

The instrument being logarithmic, it has no scale zero in the usual sense, but the invention provides means for adjusting the meter current corresponding to a given input current, so as to provide the equivalent of a zero adjustment function. This is done by inserting a variable voltage in the feed-back conductor 21 to the diode 16. As suggested in Fig. 1, an adjustable current passing through $R_3$ is supplied from a potentiometer $R_5$ through a resistor $R_4$, these elements forming a diode biasing means serving to adjust the meter current for a given input current.

The diode being a non-linear, unidirectional device, the instrument functions in the normal manner only when receiving positive signal current. When a step-transient occurs at the input terminal, for example when switching from one source of current to another, as mentioned earlier, the transient may be either positive or negative. For example, even though the source to be measured may be kept grounded prior to connection to the input, to avoid accumulation of charge, the input terminal may have departed from ground potential due to grid bias drift in the amplifier, which may result in transfer of charge between the source and input capacitance, and temporarily, at least, in a small step-transient of voltage at the input. In view of the instrument's sensitivity, this may appear quite large.

If the transient is positive, the normal mode of feedback operation causes a surge of electrons from the diode cathode 17 to the anode 15 to counteract the transient input charge. However, assuming the input transient is negative, the normal automatic rebalancing mechanism is inoperative, because of the unidirectional diode conduction. As a result, the amplifier 14 is thrown into a condition of extreme unbalance, indicated on the output meter 23 by the needle going off-scale in the low-current direction. The circuit can then become rebalanced only by the more or less slow accumulation of charge from the signal source, e. g., from the ionization chamber 10, or by leakage across the diode 16. Leakage currents across the diode are, however, deliberately maintained extremely small and, since current from the signal source is also of low magnitude, it may take up to several minutes for the instrument to recover balance. Accordingly, the invention comprehends a means of applying a positive charge to the diode plate at least large enough to neutralize the maximum negative charge calculated to be encountered in normal expected operation. While a number of circuit means could be employed to transfer a charge from a suitable circuit point to the anode 15 of the diode, these would ordinarily involve high impedance switches with high voltage acting across the switch terminals; use of contacts remotely operated as by relay means; etc.

As an important feature of the present invention, a positive charge is supplied to the anode 15 of the diode 16 through a glow discharge tube $T_1$, preferably via the limiting resistor $R_1$. This glow discharge tube may be an ordinary neon glow tube discharging to the anode 15 and energized momentarily by manual or automatic means following any input transient which may upset the circuit. A switch $S_2$ may be used in this connection to deliver a suitable positive pulse from a relatively high-voltage source 27, which may be the same regulated source that supplies the B+ potentials to the amplifier 14 and the resistor $R_5$. The switch $S_2$ is a momentary-action switch, shown in Fig. 1 as of the normally-open type but preferably of the normally-closed type suggested in Fig. 2. It may be manually actuated, as suggested by the arrow, or it may be actuated by automatic means 28 which will actuate the switch one or more times following any negative input transient. Alternatively, an additional normally-closed switch (not shown) may be provided in series wtih $S_2$, the additional switch being adapted for automatic and possibly remote automatic actuation. In this case, the additional switch is shunted with a shorting strap when manual action (switch $S_2$) is desired. Switch $S_2$, when closed, connects the voltage source 27 to a capacitor $C_3$ and to one end of a resistor $R_{12}$, the opposite end of this resistor being connected to B— of the source 27. Accordingly, whenever switch $S_2$ is closed, the capacitor $C_3$ transmits a positive pulse to the tube $T_1$, raising the anode potential to the firing point and thus transferring the desired positive charge to the anode 15 of the diode 16. In the preferred practice, the voltage applied to the capacitor $C_3$ and the ratio of $C_3$ to the maximum encountered input cable capacity are such as to assure a charge to the diode 16 greater than the usually-encountered opposite charge applied earlier by the transient. If necessary, however, the switch $S_2$ can be closed two or more times in the case of extremely large prior transients to bring the needle of the meter 23 back on scale. The use of the glow discharge tube $T_1$ for transmitting a positive charge to the diode 16 represents an arrangement which is simple, compact and inexpensive. During operation of the instrument, there is no voltage across the terminals of the tube $T_1$ except for the brief moment of discharge, so that there is no opportunity for leakage currents across the glow tube to cause an error in instrument reading.

The invention also provides a means for preventing the glow discharge tube $T_1$ from firing in a reverse direction when the switch $S_2$ in reversely actuated, i. e., opened, in either the embodiment of Fig. 1 or Fig. 2, which reverse discharge would apply a severe negative transient to the diode 16. In this connection, a resistor $R_{11}$ is connected from a point between the capacitor $C_3$ and the tube $T_1$ to the circuit ground, as shown. When the switch $S_2$ is opened, the resistors $R_{11}$ and $R_{12}$ therefore act as a voltage divider, limiting the voltage rise across the tube $T_1$ during discharge of the capacitor $C_3$ to prevent reverse discharge through this tube. The resistor $R_{12}$ can be connected to ground instead of B— if the voltage between the terminal of source 27 and ground is sufficient to deliver the necessary charge. In other instances, the lower end of the resistor $R_{12}$ can be connected to some other suitable low potential point in the circuit. The lower end of resistor $R_{11}$ is, however, preferably connected to the circuit ground potential so as to have substantially zero voltage across the tube $T_1$ when the latter is in the quiescent state.

These and supplementary circuit components are shown in greater detail in the complete wiring diagram of a typical instrument, shown in Fig. 2, omitting however the power supplies suggested by the numerals 12 and 27 of Fig. 1, each of which power supplies is conventional in design. Certain additional features detailed only in Fig. 2 can be disclosed and discussed as follows.

Referring again to the glow discharge tube $T_1$, it has been found that this tube cannot be relied upon to fire unless there is a small amount of light falling on its cathode. In the absence of this supplementary light, there may be insufficient electrons present in the discharge space of the tube $T_1$ to initiate firing within the short interval during which the transient voltage is applied—an interval which may be as short as one or two milliseconds (i. e., the time required for $C_3$ to charge when switch $S_2$ is closed). The invention provides means for constantly illuminating or insuring a sufficient ambient illumination of the tube $T_1$, this means being conveniently and preferably a second neon glow tube $T_2$ (Fig. 2) mounted near tube $T_1$ and illuminating the cathode of the latter. Electron emission from this cathode, thus excited, is sufficient to insure firing. From Fig. 2 it will be observed that the tube $T_2$ is connected between B+ and B— with a current-limiting resistor $R_{13}$ in series therewith.

In Fig. 2, the D. C. amplifier 14 is shown as including an input electron tube 30 having a grid 31 connected to the anode 15 of the diode 16. The anode of this tube is connected to a filter means 34 shown as an iterative parallel low-pass filter. Adjoining sections of this filter have different time constants, preferably of a ratio of about 20 to 1 and with time constants ranging from about ¼ second to about ten microseconds. This filter means 34 acts to stabilize the feed-back loop over a predetermined range of input frequency components, without, at the same time, making the amplifier unduly sluggish.

The anode of the input tube 30 is also connected to succeeding amplifier stages, exemplified by a multistage electron tube 35 which, in turn, supplies an amplified signal to the grid of an output tube 37, which is operated as a cathode follower. A small glow tube 39 is connected in a circuit between the output anode of the tube 35 and the grid of the tube 37, as shown. The tube 39 comprises an auxiliary means for coupling these circuit elements and acts as a convenient constant voltage-dropping device to reduce the voltage without substantial loss of power, in a manner similar to that of a biasing battery. The anodes of the electron tubes 30, 35 and 37 are connected to B+ of the regulated high-voltage source (such as the source 27 of Fig. 1) by the circuits and resistors shown. Filaments of the electron tubes 30, 35 and 37 are preferably connected serially to a regulated filament supply, which may be a part of the high-voltage source 27 of Fig. 1. Other features of this amplifier circuit are conventional and will be readily understood by a study of Fig. 2, aided by the following comments.

The switch $S_2$ in Fig. 2 is shown as a normally-closed switch—a construction which offers particular advantages. Although firing of $T_1$ cannot occur when switch $S_2$ is opened, a small negative transient is, however, applied to the diode 16 due to the capacitance represented by the glow tube electrodes and the associated wiring, even though this capacitance is very small. It is, therefore, desirable to make switch $S_2$ a normally-closed switch, which is momentarily opened and again closed to transfer the desired positive charge to the diode 16. In this way, the small negative transient is immediately neutralized upon closing the switch. Otherwise, by first closing, then opening switch $S_2$, it would be necessary to wait several seconds for the transient to disappear, before an accurate reading of the meter 23 could be made.

The amplifier 14 preferably includes a biasing means for adjusting the amplifier output to be substantially zero when the amplifier input is grounded. This biasing means is shown, by way of example, as a potentiometer $R_{16}$, the resistance element of which is connected between circuit ground and a suitable point on the filament string, and the sliding contact of which is connected by a conductor 42 to the screen grid of the electron tube 30.

In Fig. 2, resistor $R_0$ is shown as including serially-numbered resistors $R_6$, $R_7$, and $R_8$. Resistor $R_7$ is adjustable and serves as a calibration control for adjusting the change of meter current per decade change of input current, in order that the meter shall read correctly. The voltage drop across all or a part of the resistors comprising R₀ can be used as an external auxiliary output. Thus, resistor R₈ can be used to supply the auxiliary recorder output 25 previously described.

It is desirable that the input switch S₁ be a selector switch, preferably of a type functioning as suggested in Fig. 2. As therein shown, this switch can assume any one of four positions when the left-hand and right-hand paired sets of movable contacts (shown as small circles) are stepped progressively upward. In the first position, as shown, the resistor R₁ is connected directly to the main input, e. g., the ionization chamber 10, through an uppermost contact 43 of the switch, the lowermost three pairs of contacts 44, 45 and 46 being grounded through a conductor 47. In the fourth position, in which the resistor R₁ is connected to the lowermost of the movable switch contacts 46, the input is grounded for the purpose of adjusting the bias of the amplifier. In the second and third positions, in which the pairs of switch contacts 44 and 45 respectively are connected to the resistor R₁, internal test currents of predetermined value are delivered to the input for purpose of testing or adjustment of calibration.

By way of example, the circuit shown can be adapted to provide a test current of $10^{-11}$ amperes when the switch S₂ is in the second position, and a test current of $10^{-8}$ amperes when the switch S₂ is in the third position. The currents are supplied from resistor network 50 (connected between B+ and ground and including parallel-connected potentiometers R₉ and R₁₀) by way of the high-value series resistors R₁₅ and R₁₄. The movable contact of the potentiometer R₁₀ is connected through the resistor R₁₅ to the second pair of contacts 44, and the movable contact of the potentiometer R₉ is connected through resistor R₁₄ to the paired contacts 45. Potentiometers R₉ and R₁₀ provide a means of correcting, from time to time, any drift which may have occurred in the value of the checking currents, as determined by comparison with external standards applied to the input of the instrument.

It is preferable to dispose the diode 16, the input electrometer tube 30, the capacitors C₁ and C₂, and the resistors R₁, R₁₄ and R₁₅ in a constant-temperature environment; e. g., in a heated thermostatically-controlled chamber, not shown. This is very desirable, particularly as regards the diode, to insure that the cathode 17 of the diode 16 is maintained at a constant temperature, as it must be for a high-accuracy performance, and as regards the resistors R₁₄ and R₁₅, to insure that the test currents will remain constant.

Using presently available conventional diodes, an accurately responsive logarithmic output may be indicated on a single meter scale over a range of about six decades, without recourse to switching or scale changing. For example, a single scale may indicate a continuous range of input signals from $10^{-7}$ to $10^{-13}$ amperes.

As an important feature of our invention, we have found that by accurately setting the cathode of the diode to operate at a relatively low temperature, far below conventional operating temperatures, we are able to push the range of accurate diode response to extreme lower limits of at least $10^{-14}$ amperes. Our device is believed to be responsive to even smaller currents, although such measurements are difficult to obtain at the present time, not because of any lack of accurate measurement by our device, but because it is extremely difficult to generate accurately currents of this low magnitude for measurement by our device.

In order to operate diodes successfully at these lower signal levels, we have found it necessary to employ the actual cathode temperature as the criterion of correct operation, rather than the filament voltage. This is true because two different diodes, each having the same rated filament operating voltage and operating at the same applied voltage, may have a widely different cathode temperature, due to different initial temperature, different geometry of construction, radiation characteristics, etc.

We have, therefore, found it necessary to measure and adjust the actual cathode temperature in some relatively precise way. We have found this possible by measuring the amount of change in the voltage across the diode for each decade of change of input signal current. This voltage change per decade has been found to be uniquely related to the cathode temperature and to be independent of the cathode geometry, cathode work function, etc.

The relationship between the current through the diode and the voltage across the diode can be derived from previously known relationships. In simplified form applicable to the present invention, this may be written $$(1) \quad I_c = I_e^{-\frac{e}{kT}(\phi + E_R)}$$

where $I_c$ is the current through the diode; $I$ is the total emission of the cathode surface; $e$=charge on the electron; $k$=Boltzmann's constant; $T$=absolute temperature; $\phi$=work function of the cathode material; and $E_R$=voltage across the diode.

If, from the preceding equation, we derive an expression for the change of $E_R$ per decade or tenfold change of $I_c$, we find that:

$$(2) \quad \Delta E = \frac{2.30 T}{1.17 \times 10^4} \text{ or } 1.97 \times 10^{-4} T$$

where $\Delta E$=increment of voltage across the diode per decade of current change.

As a preferred practice of the invention, when diodes are employed as logarithmic detectors to respond accurately down to very low signal current levels, for example over the range of $10^{-7}$ to $10^{-13}$ amperes, the cathode temperature is desirably maintained constant at a relatively very low temperature of approximately 850° Kelvin or less, and preferably about 750° Kelvin. By use of Equation 2 above, it may be seen that the diode cathode will be at this temperature when the voltage increment per decade increase of signal current is 0.15 volt. The filament voltage of the diode is accordingly adjusted until this voltage increment prevails. For a particular diode which we have employed (a CK 5704 type), having a rated operating voltage of 6.3 volts, the required low operating voltage was 2.1±.1 volts.

Should it be desired to operate the diode at a higher temperature to obtain accurate logarithmic response to higher ranges of signal currents, for example, up to levels approaching $10^{-3}$ amperes, the novel method herein described for accurately setting cathode temperature may similarly be employed. In order to operate a single instrument over a signal current range wider than the approximate six decades presently found practicable with conventional diodes, it is possible, by switching, to alter the temperature setting of the cathode or to switch to one or more different diodes in the instrument. By this means it is at present possible for the instrument to cover a total effective range of about $10^{-3}$ to about $10^{-14}$ amperes.

Although this invention has been particularly exemplified as having a multi-decade indicating range of about six decades, useful smaller ranges may be employed in various applications, for example 3 or 4 decades. Where the emphasis is on the logarithmicity of response rather than unusual range width, even a fraction of a single decade may be usefully employed.

Various changes can be made without departing from the spirit of the invention and yet which will accomplish the desirable objects of the invention herein disclosed.

We claim as our invention:

1. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarithmic function of the anode-cathode current; an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current; and means for setting said amplifier output to be substantially zero when said amplifier input is zero, said last-named means including switch means for connecting said amplifier input to circuit ground and control means for biasing the operating point of said amplifier.

2. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarithmic function of the anode-cathode current; an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current; and a current-limiting resistor connected to said anode element and transmitting said small input current thereto.

3. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarithmic function of the anode-cathode current; an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current; and means for maintaining the temperature of said cathode element accurately constant.

4. A device accurately responsive to a small electrical input current, said device including: a vacuum tube diode having an anode element and a cathode element; circuit means for delivering said small input current to one of said elements of said diode as the anode-cathode current thereof, whereby said anode-current determines the anode-cathode voltage, said voltage being a logarithmic function of the anode-cathode current; and an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current, said feedback means including output resistance means connected to said amplifier output across which said output voltage is developed and control means inserting a variable voltage in series with said output voltage and said anode-cathode voltage for zero adjustment of said device.

5. A device as defined in claim 4 in which said control means includes a biasing resistor serially connected between said output resistance means and said diode and means for supplying a variable biasing current through said biasing resistor.

6. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarithmic function of the anode-cathode current; and an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current, said negative feedback means including resistance means for supplying a biasing voltage additive to said amplifier output voltage and means for varying the voltage drop across said biasing resistance means and consequently varying said biasing voltage for zero adjustment of the device.

7. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarithmic function of the anode-cathode current; an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current; and capacitor means connecting said anode element to said cathode element and controlling the transient response of said device.

8. A device accurately responsive to a small electrical input current, said device including: a vacuum tube diode having an anode element and a cathode element; circuit means for delivering said small input current to one of said elements of said diode as the anode-cathode current thereof, whereby said anode-cathode current determines the anode-cathode voltage, said voltage being a logarthmic function of the anode-cathode current; an amplifier providing an input, said circuit means also connecting said one element to said input, said amplifier including a direct-current negative feed-back means in circuit with the other of said elements of said diode to apply thereto an output voltage of said amplifier in opposition to said anode-cathode voltage to make the voltage input of the amplifier negligibly small compared with said output voltage and with said anode-cathode voltage and to produce an output current from the amplifier accurately responsive to the logarithm of said small input current; input switching means for selecting said input current from a plurality of input signal sources; and a capacitor connected across said input of said amplifier to minimize input capacitance changes upon operation of said switching means.

9. In a device accurately responsive to a small electrical input current, the combination of: a vacuum tube diode having an anode element, a cathode element and a filament; circuit means for delivering said small input current to one of said elements of said diode as the anode-cathode current thereof, whereby said anode-cathode current determines the anode-cathode voltage; an amplifier providing an input, said circuit means also connecting said one element to said input, said amplifier including a feed-back means in circuit with the other of said elements of said diode to apply thereto an output voltage of said amplifier in opposition to said anode-cathode voltage; indicating means responsive to said anode-cathode voltage; means for successively applying first and second known currents to said diode in place of said small input current; and control means supplying a variable regulated voltage to said filament whereby the temperature of said cathode element can be varied.

10. A device as defined in claim 9 in which the change in said anode-cathode voltage per decade difference of said applied known currents is substantially 0.15 volts.

11. A device for producing an electric output which is a logarithmic function of a small positive input current, said device including: an amplifier having a direct-current negative feed-back circuit feeding back an amplifier output voltage to the amplifier input; a vacuum tube diode serially connected intermediate said amplifier input and said feed-back circuit, said diode including an anode and a cathode; means for delivering said small positive input current to said diode to comprise the anode-cathode current, so that the anode-cathode voltage is a logarithmic function of said anode-cathode current, the feed-back voltage being connected in opposition to said anode-cathode voltage, said amplifier becoming unbalanced in response to a negative input transient; and balancing means for applying a predetermined positive charge to said anode upon occurrence of such unbalance.

12. A device as defined in claim 11 in which said balancing means includes first circuit means connecting a capacitor means and a point of positive potential for charging said capacitor to a predetermined level, and second circuit means connecting said capacitor means to said anode for transferring thereto a predetermined positive charge from said capacitor means.

13. A device as defined in claim 11 in which said last-named means includes a glow discharge tube connected between a point of positive potential and said anode, the conduction of said glow discharge tube imposing a positive charge on said anode sufficient at least partially to correct said unbalance.

14. A device as defined in claim 13 including illumination means directing light onto the cathode of said glow discharge tube.

15. In a device accurately responsive to a small electrical input current, the combination of: a vacuum tube diode having an anode element, a cathode element and a filament; circuit means for delivering said small input current to one of said elements of said diode as the anode-cathode current thereof, whereby said anode-cathode current determines the anode-cathode voltage; an amplifier providing an input, said circuit means also connecting said one element to said input, said amplifier including a feed-back means in circuit with the other of said elements of said diode to apply thereto an output voltage of said amplifier in opposition to said anode-cathode voltage; means for successively applying first and second known currents to said diode in place of said small input current; and indicating means responsive to said anode-cathode voltage, including means for adjusting the response range of said indicating means to coincide with said known currents.

16. A device as defined in claim 13 including a momentary-action switch connected in circuit between said point of positive potential and said glow discharge tube and controlling the delivery of potential from such point to such tube.

17. A device as defined in claim 16 in which said momentary-action switch is normally closed and is momentarily opened and then closed to correct at least partially said unbalance.

References Cited in the file of this patent
UNITED STATES PATENTS

| | | |
|---|---|---|
| 2,244,369 | Martin | June 3, 1941 |
| 2,554,905 | Hawkins et al. | May 29, 1951 |

UNITED STATES PATENT OFFICE

CERTIFICATE OF CORRECTION

Patent No. 2,799,005                                         July 9, 1957

George H. Hare et al.

It is hereby certified that error appears in the printed specification of the above numbered patent requiring correction and that the said Letters Patent should read as corrected below.

Column 5, line 42, for "$S_2$ in" read -- $S_2$ is --; column 6, line 71, for "$R_7$", second occurrence, read -- $R_6$ --; lines 72 and 73, for "adjustin" read -- adjusting --; column 7, line 34, before "resistor" insert -- the --; line 41, for "th capacitors" read -- the capacitors --; column 9, line 64, for "anode-current" read -- anode-cathode current --.

Signed and sealed this 22nd day of October 1957.

(SEAL)
Attest:

KARL H. AXLINE                                    ROBERT C. WATSON
Attesting Officer                                 Commissioner of Patents